March 7, 1950     H. H. TRAIL     2,499,798
TRANSMISSION OIL FILTER MEANS
Filed Nov. 27, 1944
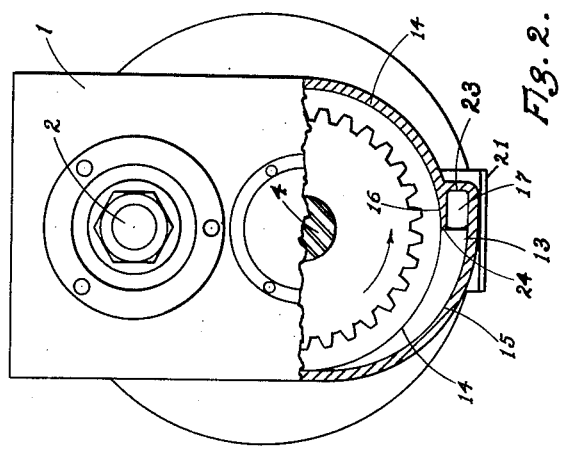
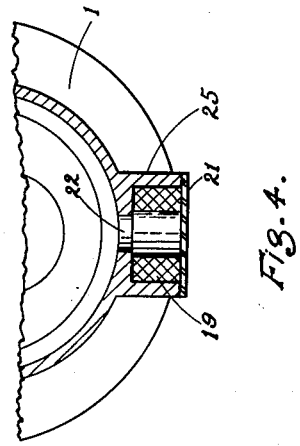
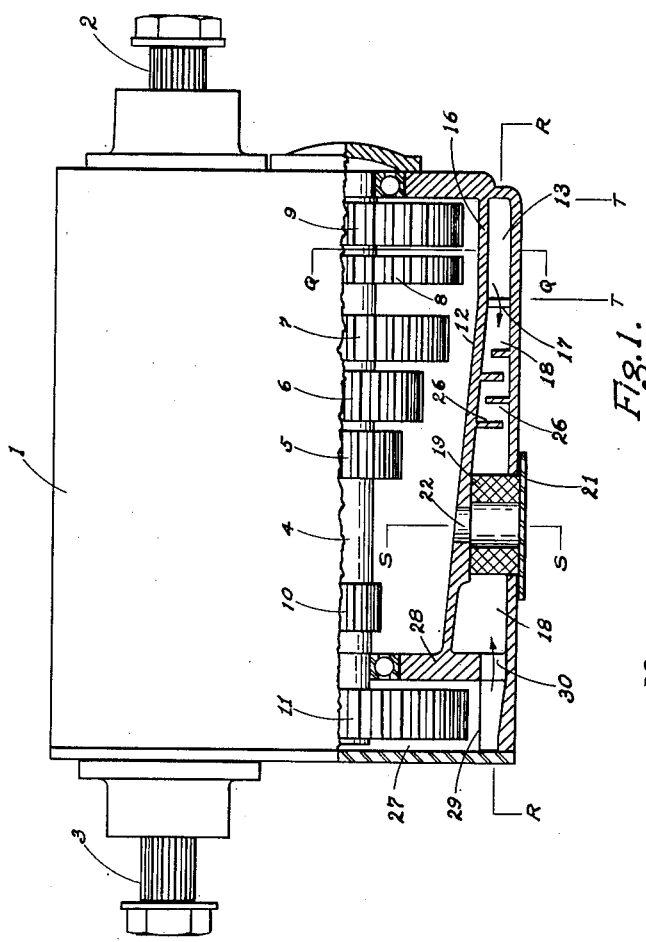
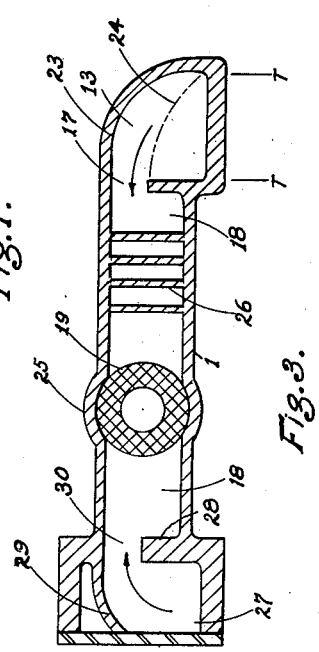
INVENTOR.
Herbert H. Trail Patented Mar. 7, 1950

2,499,798

UNITED STATES PATENT OFFICE 2,499,798

TRANSMISSION OIL FILTER MEANS

Herbert H. Trail, Kalamazoo, Mich., assignor to Fuller Manufacturing Company, Kalamazoo, Mich., a corporation of Delaware Application November 27, 1944, Serial No. 565,273

5 Claims. (Cl. 184—13)

The present invention relates to a gear transmission oil filtering means and has for its purpose to remove dirt, metal chips and grindings and other foreign matter from the lubricating oil within the transmission case.

Filtering means now in use for such a purpose usually require a pump to provide a pressure differential to circulate the oil through the filter element. This usually requires a special gear drive for the pump, and pipes and fittings connecting the pump and filter means, all of which, complicates the mechanism and incurs additional cost of manufacture.

In my patent application, Serial No. 543.239½ filed July 3d, 1944, now Patent Number 2,462,819, I show a filtering means adapted to be secured to the power take-off of existing transmissions—as an accessory, whereas, in the present invention it is incorporated in the design of the transmission case.

In my present invention I provide a simple and efficient means for filtering the lubricating oil of geared transmissions by providing the transmission case with a specially formed bottom having a sump designed to insure concentration of foreign matter adjacent an inlet to filtering means, also one end of the sump conveniently forming a special baffle means to provide a maximum pressure differential adjacent the said opening to insure circulation of oil within the transmission through filtering means to remove the foreign matter therefrom.

These and other objects of the invention will be apparent to those skilled in the art from a study of the following description and accompanying drawings in which:

Figure 1 is a longitudinal part sectional elevation view.

Figure 2 is a part sectional front end view.

Figure 3 is a fragmentary sectional plan view at R—R of Figure 1.

Figure 4 is a fragmentary cross sectional view at S—S of Figure 1.

Similar reference numerals refer to like parts throughout the several drawings.

The numeral 1 is a transmission case which supports for rotation the driving shaft 2 and the driven shaft 3, also the countershaft 4 which supports the cluster of gears 5, 6, 7, 8, 9, 10 and 11 which—coacting with gears (not shown) supported on the shafts 2 and 3—provide the various speed ratios in a manner well known to those in art.

The bottom 12 of the transmission case 1 is so formed to slope downwards from all directions converging adjacent the sump 13 directly under the gears 8 and 9 near the front of the transmission. The cross section portion of Figure 2 is at line Q—Q of Figure 1 and shows the particular contour of the bottom of the transmission case at this cross section. It is noted that the contour 14 is uniform to that of the gears 8 and 9, while the contour 15 falls away from the contour 14 to form the sump 13 and the baffle wall 23. The contour 14 abruptly ends at 24 for the longitudinal section from "T" to "T" forming—at this point—a roof over the sump 13 which also extends from "T to T." The baffle wall 23 and the end 24 of the roof section 16 have longitudinal contours as shown at 23 and 24 respectively in Figure 3. The inlet opening 17 to the settling compartment 18 is situated adjacent the baffle wall 23 and under the roof section 16. The baffles 26 are alternatively formed upon, or secured to, the transmission case in such a manner that oil circulating through the settling compartment 18 is alternatively diverted substantially in an upward and downward direction. The filter element 19—which may be of any well known type—is conveniently held in position by the arc form section 25 of the settling compartment 18, which also prevents the oil passing from the front to the rear section of the settling compartment 18. The cover plate 21 is for the purpose of conveniently removing the filter element 19. It is further noted that the cross section of the transmission case which forms the sump 13 progressively recedes away from the gears in the direction of rotation thereof and terminating with one of its vertical side walls curved to form a baffle across the radial path of one or more of the gears with a roof section adjacent the inlet opening 17 provides a streamlined and positive course into the opening also, a maximum pressure differential to insure circulation of the oil through the filter element.

The settling compartment 18 may be conveniently formed as part of the transmission case 1, similarly as shown in Figure 4, which is a fragmentary cross section view at S—S of Figure 1.

It is noted that the outlet opening 22 is located at a position intermediate the radial path of the gears 5 and 10 and that these gears are of a relatively smaller diameter than the gears 8 and 9. It is significant that the outlet opening 22 be similarly situated as described, that is, in a position intermediate the radial path of the relatively smaller gears 4 and 5 or, where the centrifuging effect of the rotating gears upon the lubricating oil is at a minimum; also, that the inlet opening 17 be situated adjacent the baffle wall 23 and the radial path of the relatively larger gears 8 and 9, where the centrifuging effect of the rotating gears is at a maximum. In this manner, a pressure differential exists as between the inlet opening 17 and the outlet opening 22 thereby causing the lubricating oil to circulate through the settling compartment 18 and the filter medium 19.

In operation, the transmission case 1 is usually about one third filled with lubricating oil and the countershaft cluster of gears rotating in the direction of the arrow shown in Figure 2. At speed, the oil is centrifuged by the rotating gears at a high rotational velocity when it is abruptly retarded by the baffle wall 23, creating an increased pressure differential at this point. Referring to Figure 3 it is noted that the baffle wall 23 curves from the radial to the axial plane of the gears and therefore, divert the oil in the direction of the arrow and through the inlet opening 17 into the settling compartment 18 where it is substantially diverted in an upward and downward direction between the baffles 26—to cause precipitation of foreign matter between the baffles—and through the filter element 19 and again re-entering the transmission case proper through the outlet opening 22. In most transmission cases now in use the cast bottom is either flat or irregular in form, resulting in pockets where foreign matter may accumulate and be re-circulated with the oil when the gears are rotated in an opposite direction. In a transmission case designed in accordance with my invention the bottom of the case proper is relatively uniform in shape and slope downward in all directions converging adjacent the sump 13 and the inlet opening 17. Due to this feature, all foreign matter is either centrifuged or diverted into the sump 13 and filtering compartment 18.

In some instances, the transmission case 1 may be divided into two sections, as shown in Figure 1, where the gear 11 is contained in a separate compartment 27 which is divided from the main compartment by the partition 28. So that the lubricating oil entering the compartment 27 may also be filtered, I provide similar means as above referred to for this purpose. The baffle wall 29 is for a similar purpose as the baffle wall 23, and diverts the oil centrifuged by the rotating gear 11 in the direction of the arrow, through the opening 30 into the settling compartment 18, through the filter element 19 and again re-entering the transmission case proper at the opening 22.

It is noted that differing relative speeds of gears 9 and 11 or their having different diameters, effect the localized pressure differentials adjacent the inlet openings 17 and 30. Therefore, it is essential that the oil cannot bypass the filter element 19, permitting the oil passing from the forward to the rear section of the settling compartment 18, and vice versa. Therefore it is obvious, when two inlet openings are used (as shown in Figure 1) that there must be no direct connection between the inlet openings 17 and 30, otherwise the oil would escape by way of the opening having the minimum pressure differential instead of passing through the filter element 19. To eliminate this by-passing, and the necessity of using two filter elements, I support the filter element 19 in the position and manner shown in Figures 1, 3 and 4.

To obtain the maximum pressure differential as between the inlet openings 17 and 30 and the outlet opening 22, it is preferable that the sump 13 and the baffle wall 23 be situated in the radial path of the relatively larger gears of the transmission countershaft, as the centrifuging effect of the larger gears is considerably greater than that of the smaller gears; also, that the outlet opening 22 be situated in a position least effected by the centrifuging action of the transmission countershaft gears.

In describing my invention I have pointed out how it is possible to efficiently remove foreign matter from the oil within a geared transmission case in a simple, cheap and reliable manner, by providing the case with a specially formed bottom designed to concentrate foreign matter at a lowest point forming a trap and baffle means to provide a maximum pressure differential to insure guidance of the foreign matter into a settling compartment and the oil to circulate through a filtering element.

It is to be understood that the term "settling compartment" includes any form of a chamber or recess so formed that the lubricating oil may be circulated through it and where foreign matter in the oil may settle due to the circulation of the oil through the chamber or recess.

While the invention has been described more or less in detail it is obvious that the transmission case may be formed in many ways to provide the results above referred to, and that various filtering means may be provided, and that various modifications and rearrangements will suggest themselves to those in the art, and all such modifications and rearrangements are contemplated as falling within the scope of the following claims.

What I claim is:

1. A transmission oil filtering means comprising a gear case having gears rotatably supported therein, a settling compartment positioned below the bottom of said case, a sump formed in the bottom of said case and positioned in the path of oil centrifuged by one or more of said gears, an inlet opening connecting the sump with the settling compartment, an outlet opening connecting the said compartment with the gear case, a filter element interposed between said openings, the walls of said sump forming a baffle to direct oil under pressure into said inlet opening and through the filter element to filter the oil returning to the said case by way of the said outlet opening.

2. A transmission oil filtering means comprising a gear case having gears rotatably supported therein, a settling compartment positioned below the normal bottom of said case, a sump positioned below the normal bottom of the said case, an inlet opening connecting the said compartment with the sump, and an outlet opening connecting the compartment with the gear case, a filter element disposed in said compartment between said inlet and outlet openings, said sump positioned in the radial path of oil centrifuged by the rotating gears and having side walls forming a baffle to direct oil under pressure into said inlet opening and through the said filter element to filter the oil and return to said case by way of the outlet opening.

3. A transmission oil filtering means comprising a gear case having a plurality of different size gears mounted for rotation therein, a settling compartment positioned below the normal bottom of said case, said compartment being axially disposed to the transmission and having inlet openings at each end thereof, a filter element positioned intermediate the ends of said compartment and having an outlet connecting said case, one or more sumps having side walls positioned below the normal bottom of said case and in the path of oil centrifuged by the rotating gears, the walls of said sumps shaped to form baffles to divert the oil under pressure into said openings and through the filter element to filter the oil, the said filter element arranged to divide the settling compartment into two distinct sections to prevent oil by-passing from one section to the other when a pressure differential exists in the said sections.

4. A transmission oil filtering means comprising a gear case having gears rotatably supported therein, a settling compartment positioned below the bottom of said case, said compartment being axially disposed in relation to the transmission and having inlet openings at each end thereof, a filtering element positioned intermediate the ends of said compartment dividing it into two sections, the center of said filtering element connecting an outlet of said compartment into said case, and baffle means formed in the bottom of said case in the path of oil centrifuged by the rotating gears to divert the oil under pressure into the two said inlet openings and through said filtering element to filter the oil and return it into the gear case.

5. A transmission oil filtering means comprising a gear case having gears rotatably supported therein, a settling compartment positioned below the normal bottom of said case, a sump having side walls and the bottom thereof positioned below the normal bottom of said case, the settling compartment having an inlet opening connecting the sump, and an outlet connecting the gear case in a position relatively little affected by oil centrifuged by the gears, a filter element positioned in said settling compartment and interposed between said inlet and outlet openings, said sump having a roof formed thereover adjacent said inlet opening and positioned in the path of oil centrifuged by the rotating gears to create a pressure to force the oil into said inlet opening and through the filter element and outlet opening to filter the oil.

HERBERT H. TRAIL.

REFERENCES CITED

The following references are of record in the file of this patent:

UNITED STATES PATENTS

| Number | Name | Date |
|---|---|---|
| 1,019,645 | Holdsworth | Mar. 5, 1912 |
| 1,508,914 | Belden | Sept. 16, 1924 |
| 1,736,705 | Grandjean | Nov. 19, 1929 |
| 1,759,943 | Herrmann | May 27, 1930 |